(12) United States Patent
Hyyppa

(10) Patent No.: US 6,792,684 B1
(45) Date of Patent: Sep. 21, 2004

(54) METHOD FOR DETERMINATION OF STAND ATTRIBUTES AND A COMPUTER PROGRAM TO PERFORM THE METHOD

(75) Inventor: Juha Hyyppa, Espoo (FI)

(73) Assignee: Diware Oy, Espoo (FI)

( * ) Notice: Subject to any disclaimer, the term of this patent is extended or adjusted under 35 U.S.C. 154(b) by 159 days.

(21) Appl. No.: 10/111,145

(22) PCT Filed: Oct. 26, 2000

(86) PCT No.: PCT/FI00/00930

§ 371 (c)(1),
(2), (4) Date: Apr. 18, 2002

(87) PCT Pub. No.: WO01/31290

PCT Pub. Date: May 3, 2001

(30) Foreign Application Priority Data

Oct. 28, 1999 (FI) .............................. 19992319

(51) Int. Cl.⁷ ............................................. G01B 11/00
(52) U.S. Cl. .................... 33/1 A; 33/DIG. 21; 356/4.01
(58) Field of Search .................. 33/1 A, 121, DIG. 21; 356/4.01, 5.01–5.15, 141; 382/100, 108, 154

(56) References Cited

U.S. PATENT DOCUMENTS

| | | | | |
|---|---|---|---|---|
| 2,608,763 A | * | 9/1952 | St. John ........................ | 33/1 A |
| 2,736,094 A | * | 2/1956 | Domeshek .................... | 33/1 A |
| 3,527,533 A | * | 9/1970 | Hook et al. ................. | 356/5.04 |
| 4,289,397 A | * | 9/1981 | Itzkan et al. ................ | 356/5.01 |
| 4,497,551 A | * | 2/1985 | Lapeyre ........................ | 33/1 A |
| 4,502,782 A | * | 3/1985 | Werner et al. ............. | 356/5.08 |
| 4,722,599 A | * | 2/1988 | Fruengel et al. ........... | 356/5.06 |
| 4,727,374 A | * | 2/1988 | Boulais ....................... | 356/4.01 |
| 5,189,424 A | * | 2/1993 | Brown ......................... | 342/25 |
| 5,191,385 A | * | 3/1993 | Kasser ........................ | 356/5.01 |
| 5,557,397 A | * | 9/1996 | Hyde et al. ................ | 356/5.01 |
| 5,828,443 A | * | 10/1998 | Fujioka et al. ............. | 356/5.08 |
| 5,867,257 A | * | 2/1999 | Rice et al. .................... | 356/5.09 |
| 5,898,485 A | * | 4/1999 | Nati, Jr. ..................... | 356/5.08 |
| 6,173,067 B1 | * | 1/2001 | Payton et al. ............... | 382/154 |
| 6,415,044 B1 | * | 7/2002 | Simpson et al. ............ | 382/108 |
| 6,587,601 B1 | * | 7/2003 | Hsu et al. ................... | 382/154 |

FOREIGN PATENT DOCUMENTS

| | | |
|---|---|---|
| GB | 2315941 | 2/1988 |
| JP | 9184880 | 7/1997 |
| JP | 11023263 | 1/1999 |
| JP | 11248443 | 9/1999 |

OTHER PUBLICATIONS

"Modeling Forest Canopy Heights: The Effects of Canopy Shape", by Ross Nelson, *Remote sensing of environment*, vol. 60, No. 3, 1997, USA, pp. 327–334.

(List continued on next page.)

Primary Examiner—G. Bradley Bennett
(74) Attorney, Agent, or Firm—Rolf Fasth; Fasth Law Offices (57) ABSTRACT

The invention relates to a method for the determination of stand attributes with an instrument above the stand. In the method, three-dimensional information is collected from the stands by using such a number of sample hits, that individual trees or groups of trees can be distinguished. A three-dimensional tree height model is produced from collected information. Stand attributes—which are characteristics of individual trees or groups of trees and/or characteristics derived using these information for larger areas—are determined from the tree height model. The invention also relates to a computer program which can be used to carry out the second and third step of the method.

20 Claims, 7 Drawing Sheets

OTHER PUBLICATIONS

"A forest canopy height surface model for scene simulation", by Lee K. Balick, *Simulation*, vol. 49, No. 1, Jul. 1987, USA, pp. 5–12.

"Testing ™ and Spot Data as Input to a Canopy Reflectance Model for Mapping Density and Size of Trees in Forest Stands", by Arnt Kristian Gjertsen, *IGARSS'93. 1993 International Geoscience and Remote Sensing Symposium (IGARSS'93), Better Understanding of Earth Environment (Cat. No. 93CH3294-6)*, Pt. vol. 2, New York, NY, USA, 1993 IEEE, pp. 750–752.

"Global Object Reconstruction using Airborne Video Imagery: The ESPRIT-III GLORE Project", by Mikael Holm, *Proceedings of the SPIE—The International Society of Optical Engineering*, vol. 2598, 1995, USA, pp. 306–314.

"Automated delineation of individual tree crowns in high spatial resolution aerial images by multiple—scale analysis", by Tomas Brandtberg and Fredrik Walter,*Machine Vision and Applications*, vol. 11, No. 2, 1998, Germany, pp. 64–73.

"Comparing accuracy of satellite– and airborne remote using data in the retrieval of forest stand attributes", J. Hyyppa, et al., *Geoscience and Remote Sensing*, 1997, IGARSS Remote Sensing—A scientific Vision for Sustainable Development., International, vol. 2, pp. 1081–1083.

"Radar–Derived Standwise Forest Inventory", Juha Hyyppa, et al., Mar. 1997, *Geoscience and Remote Sensing, IEEE*, vol. 35, Issue 2, pp. 392–404.

"Accuracy of forest inventory based on radar–derived stand profile", J. Hyyppa, et al. Aug. 18–21, 1993, *Geoscience and Remote Sensing Symposium, 1 IGARSS '93, Better Understanding of Earth Environment., International*, vol. 2, pp. 391–393.

"Forest Inventory Using Forest Canopy Profiles", J. Hyyppa, et al., 1992, *Geoscience and Remote Sensing Symposium, 1 IGARSS '93, International*, vol. 2, pp. 1216–1219.

* cited by examiner

METHOD FOR DETERMINATION OF STAND ATTRIBUTES AND A COMPUTER PROGRAM TO PERFORM THE METHOD

PRIOR APPLICATION

This application is a U.S. national phase application based upon International Application No. PCT/FI00/00930, filed 26 Oct. 2000; which claims priority from Finnish Application No. 19992319, filed 28 Oct. 1999.

The invention relates to a method for forest inventory and the determination of stand attributes. With the aid of the method, stand attributes of trees, sample plots and larger forest areas can be measured by measuring and deriving the most important characteristics of individual trees. The invention also relates to a computer program to carry out the method.

PRESENT STATE OF ART

Conventional forest inventory is mostly based on field measurements. E.g. forest inventory at stand level, in which the forest is first divided into almost homogeneous forest units (typically 1–3 hectares in size), is presently based on plot measurements and subjective ocular inventory. Aerial photographs and orthophotos (aerial photos rectified to map projection) are typically used in delineation of stand boundaries and determination of the walking route in the forest However, stand attributes, such as the volume ($m^3$/ha), the basal area ($m^2$/ha, depicts the cross-sectional area per hectare at the height of 1.3 m), mean height (m), other density type characteristics, tree species, age, and development class, are determined by measurements and assessments carried out in forests. This work has been tried to been made more effective by increasing the level of automation, e.g. by field computers and by more automatic measurement equipment (e.g. patent Fl 101016 B). In forest inventory at stand level, tree and stand attributes are calculated by plotwise information carried out in the same stand and by ocular estimation. In addition to standwise forest inventory, plotwise forest inventory, measurements of single trees, and estimation of larger areas, such as whole nations or parts of them, are carried out.

Remote sensing methods (measurement of target properties without any physical contact) have been studied for a long time as an alternative and future method for the traditional field inventory work. At large area forest inventory, promising results have been obtained by using satellite imagery (e.g. *Tomppo E. 1991. Satellite image-based national forest inventory of Finland. International Archives of Photogrammetry and Remote Sensing.* 28: 419–424). In such methods, field-measured plotwise data are typically used as a teaching data set and the satellite image is used to generalize this carefully corrected field data for the whole image. A prerequisite for a successful solution for small areas is that features (channels, ratio of channels and the like) from the satellite image that correlates strongly with stand attributes collected at plot level have to be found. Thus, the method is capable for large area forest inventory. By improving the quality of remote sensing data sources, by taking into account airborne data acquisitions, the accuracy of remote sensing based estimates can be improved. Despite this, the accuracy required in standwise forest inventory (about 15% error tolerated, R. Päivinen, A Pussinen, and E. Tomppo, 1993, "Assessment of boreal forest stands using field assessment and remote sensing", *Proceedings of Earsel 1993 Conference "Operationalization of Remote Sensing", ITC Enshedene, The Netherlands,* 19–23 Apr., 1993, 8p.) has not been obtained by the use of remote sensing methods.

As an example, the standwise forest inventory in Finland by forestry organizations is performed totally by field work and the national forest inventory is carried out with the help of satellite imagery (such as using Landsat TM images with 30 m spatial resolution). A rather extensive description of accuracy obtained with various remote sensing data sources are depicted in the publications (J. Hyyppä, Hyyppä, H., Inkinen, M., Engdahl, M., Linko, S. and Zhu, Y-H., 1998. *Accuracy of different remote sensing data sources in the retrieval of forest stand attributes. Proceedings of the First International Conference on Geospatial Information in Agriculture and Forestry.* Lake Buena Vista, Fla., USA, 1–3 Jun. 1998, Volume I, pp. 370377, and J. Hyyppä, Hyyppä, H., Inkinen, M, Engdahl, M., Linko, S., Zhu, Y-H., 1999a, Accuracy comparison of various remote sensing data sources in the retrieval of forest stand attributes, *Journal of Forest Ecology and Management* (in press)). The applicant of this patent proposal does not know any remote sensing-based forest inventory method that would satisfy the accuracy requirements of standwise forest inventory;

Another type of a method for stem attribute estimation of a forest plot is depicted in the Finnish patent 101016 B. The method registers optically all trees within a defined radius from a selected center. You can e.g. use the AccuRange 3000-LIR laser rangefinder, the accuracy of which is one $65535^{th}$ of 360° or a pulse detector. The registration is carried out by a rotation measurement unit in such a way that the tangent is calculated as the difference in the absolute angular rotation from the discontinuity parts occurring at both sides of the stems. The method (Finnish patent 101016 B) can be used to automate conventional collection of plotwise data but it requires work done in forest and it is rather slow (one rotation takes 1 to 6 minutes, so that the computer would have time to transfer the measurement data). The method is also inventory based on diameter measurements at horizontal level. The major problem with the method depicted in Fl patent 101016 B is that it is so slow that it is suitable only for collecting small amounts of sample from the whole stand.

Previously, aircraft and helicopters have been used to measure forest canopy height with lasers and microwave radars. These earlier measurements were based on measurements of cross-sectional areas of forests (along the flight direction, the height of the stand was measured from the area illuminated with the laser or the radar). Examples of such studies are e.g. R. Nelson, Krabill, W. B., and Maclean, G. A. 1984, "Determining forest canopy characteristics using airborne laser data", *Remote Sensing Environment,* 15:201–212, and J. Hyyppä, Hallikainen, M., 1996. *Applicability of airborne profiling radar to forest inventory. Remote Sensing Environment,* 57: 39–57. Individual trees were not analyzed in these studies, since the images were two-dimensional cross-sections. With these measurements, the tree height was obtained and other attributes derived from that by using regression formulas. The volume estimation errors were at the best about 26.5%, which is not enough for operational use.

Näsent (e.g. E. Näsent, "Determination of mean tree height of forest stands using airborne laser scanner data", *ISPR J. Photogramm. Remote Sensing,* 52, pp. 49–56, 1997.) was able to produce equally distributed samples from the forest using laser scanning, but the estimation of stand characteristics was performed by using statistical methods in a similar way as the previous profiling measurements. As an example, the mean tree height estimate was calculated by taking minimum and maximum heights of laser data within a certain window size.

In year 1999, Hyyppä et al. (J. Hyyppä, Hyyppä, H., Samberg, A., 1999, *Assessing Forest Stand Attributes by Laser Scanner, Laser Radar Technology and Applications IV, Proceedings of SPIE*, 3707, 57–69.) demonstrated that it is possible to measure the height of dominant trees by using high pulse rate laser scanner. In this study, volume estimation based on height samples was tested by using a similar approach as previous profiling measurements conducted with lasers and radars. Additionally, a virtual reality tree height model produced with laser scanner was presented in this study. In this work, individual trees were not segmented or recognized and neither any other stand attributes or individual trees.

Also Gunilla Borgefors et al. (Gunilla Borgefors, Tomas Brandberg, Fredrik Walter *"Forest parameter extraction from airborne sensors"*, APRS, Vol.32, Part3-2WS, *"Automatic Extraction of GIS Objects from Digital Imaging"*, München 8–10 Sep. 1999, pp. 151–158) have proposed the use of laser data for stand attribute retrieval. In the publication, the stem number and the crown size is defined from an image obtained by means of laser data by analyzing the height differences of different areas appearing in the image to a certain reference. The real heights of individual trees mere not analyzed in the publication.

Laser scanning and radar technology have also been generally used for the creation of terrain models by measuring, from above, the distance between a target and a radar (henceforth radar is used as a general name for both the laser and the microwave radar) on the basis of the transmission time of the pulse. Laser radar is also called lidar (light detection and ranging). In such measurements, the laser scanner sweeps the laser pulse formed by the radar across the flight line perpendicularly to the flight line. In this way, the whole target area is covered. Almost adjacent beams are obtained (each beam is typically about a couple of tens of cm in diameter) from the area, and for each beam x, y, and z coordinates are obtained. By analyzing these points, we can calculate various kinds of digital terrain models. A microwave radar operates with a similar principle as the laser radar, the frequency of the transmitted signal is, however, in the microwave region. With microwave radars, the scanning can be performed by using electrical or mechanical scanning mechanisms. A typical beam size on the ground surface produced by the microwave radar is several meters; on the other hand, SAR technology (Synthetic Aperture Radar) can be used to improve the spatial resolution of microwave radar. With microwave radar you can simultaneously measure the distance from both the crown and the ground, why the production of various kinds of terrain models is simpler; on the other hand, it is more difficult to obtain the same spatial resolution as with present and future laser scanners, which are capable to almost 100 kHz pulse repetition rates. This gives an opportunity to record the target with even 0.5 m spatial resolution.

The object of this invention is to develop a remote sensing-based method for forest inventory and retrieval of stand attributes, a method which is faster, more accurate than previous remote sensing-based methods, and which gives better possibilities for further data handling, and which is relatively cost-effective.

SUMMARY OF THE INVENTION

The method of the invention for stand attribute retrieval by using a measurement sensor above the stand is mainly characterized in that three-dimensional information is collected from the stand by using such a large number of samples that individual trees or groups of trees can be discriminated. The collected information is used to produce a three-dimensional tree height model of the forest. From the height model, stand attributes are derived. Stand attributes—which are characteristics of individual trees or group of trees and/or characteristics derived using this information for larger areas—are determined from the tree height model The determination of the stand attributes is preferably carried out in three phases in the invention 1) Construction of a high-resolution three-dimensional measurement from the stand area.
2) Calculation of a three-dimensional tree height model from the measurement data.
3) Determination of stand attributes from the three-dimensional tree height model by using individual trees and groups of trees.

The second and third steps of the method of the invention can be performed by means of a computer program.

In this document, high-resolution refers to a data set capable to discriminate individual trees.

In the boreal forest zone in the Northern Hemisphere and in many economically exploited forest areas and in other forest areas, there exist gaps between the tree crowns. For example, in a thick forest in Finland, more than 30% of the laser pulses are, however, reflected from the ground. By significantly increasing the laser pulse rate (number of pulses sent per second), samples can be obtained from each individual tree crown and also from the ground between the trees. This means that several laser pulses must be recorded per $m^2$. This allows creation of high-resolution stand maps from laser scanner data. When this material is processed, a terrain model and a crown model can be calculated, as well as the difference between these, in other words a tree height model. By analyzing the tree height model by using e.g. pattern recognition methods, it is possible to locate individual trees, determine individual tree heights, crown diameters, tree species and, by using that data, to derive the stem diameter, number of stems, age, development class, basal area and stem volume for each individual tree. Corresponding information divided into tree species categories can be calculated for sample plots and stands. It is also depicted in the invention how old stand information and knowledge (knowledge-based systems) can be used to improve the accuracy of the stand attributes to be estimated.

The method depicted in the invention is so far the most accurate remote sensing-based forest inventory method of all such methods. The advantage of the invention over typical remote sensing-based methods is that the invented method measures clear physical characteristics from the target in the form of distance data. By using generally known formulas, these parameters can be used to derive stand attributes, such as the volume. Thus, the method does not necessarily require the use of sample plots as teaching material, which reduces the costs of the method.

A high-resolution three-dimensional image is a prerequisite for the use of the method. The density of the measurements (referring to the distance between the near-by pulses on the ground) influence strongly on the usability of the laser-derived data set. In the invention it has been understood to take the benefits of the increased pulse repetition rates of the laser scanners in a method, which is more recognition-based (several pulses per square meter are obtained, whereby the derivation of several target features begin to appear) than the present state of art methods, which use pure statistical methods. The increases in pulse rate in a way according to the invention gives considerable advantage to forest inventory. High pulse rate enables high spatial resolution and, thus, it is possible to determine characteristics of individual trees. Previously, it has not been possible to produce images, which are capable to discriminate individual trees and to accurately derive such attributes of individual trees, that can be used to calculate, e.g., the volume.

The invented method is generally capable to produce volume estimates for forest stands with errors less than 15% in the boreal forest zone. The method is applicable also elsewhere, especially in plantation forests in the Tropics. This has enabled the generation of a tree map of the forest stand seen from above and because the map is directly in the digital form and because most of the forest information is nowadays recorded in geographical information systems, it is even possible to monitor individual areas and update the treatments to be done even by individual trees. This can be necessary, e.g. in parks and other valuable areas. The cost-efficiency of the method will be continuously improved by the rapid development of laser scanning and radar technology. Full automation (processing of the collected information by means of a computer) is also possible.

In the following, the invention is presented in detail by using figures and examples, which are not meant to restrict the invention by any means.

FIGURES

FIGS. 1 to 3 roughly describe the measurement principle for clarification. FIG. 8 is a rough visualization of the determination of boundaries of crowns.

DETAILED DESCRIPTION OF THE INVENTION

Performing High-resolution Three-dimensional Measurement in Forest Area

In the invented method, the applied sensor can either be a broadbeam laser scanner or a scanning radar operating in the radio wave frequency range, which have similar operation principles. The most important aspect is to produce high-resolution three-dimensional information from the forests by using the radar principle allowing determination of individual trees or group of trees and further used to determination of stand attributes.

If the beam size produced by the laser scanner is of the order of 1 m, the sensor can register—with the same pulse—the echo of the stand. From the same echo, both the distances from the ground and from the crown can be determined. The situation with the scanning radio frequency radar is similar. The difference to a narrow-beam laser scanner is, thus, merely that also the ground echo can be more frequently measured, in other words, the penetration of the signal through the stand is better. With such sensors, a terrain model can be obtained easier. The narrow-beam laser scanners presently represent a potential instrument for determination of tree height models. Therefore, in the following, we will concentrate on how it can be used to produce a tree height model and how its data can be applied in forest inventory. Even though, in the following, we will talk about laser scanners (narrow-beam), the invention on a general level also covers the principles of how broad-beam laser scanners and radar are operating at the radio frequency range operate at forest conditions. The latter can only be used to produce three-dimensional volume models as raw results, whereas the former is merely used to produce three-dimensional surface models.

Figure 1:
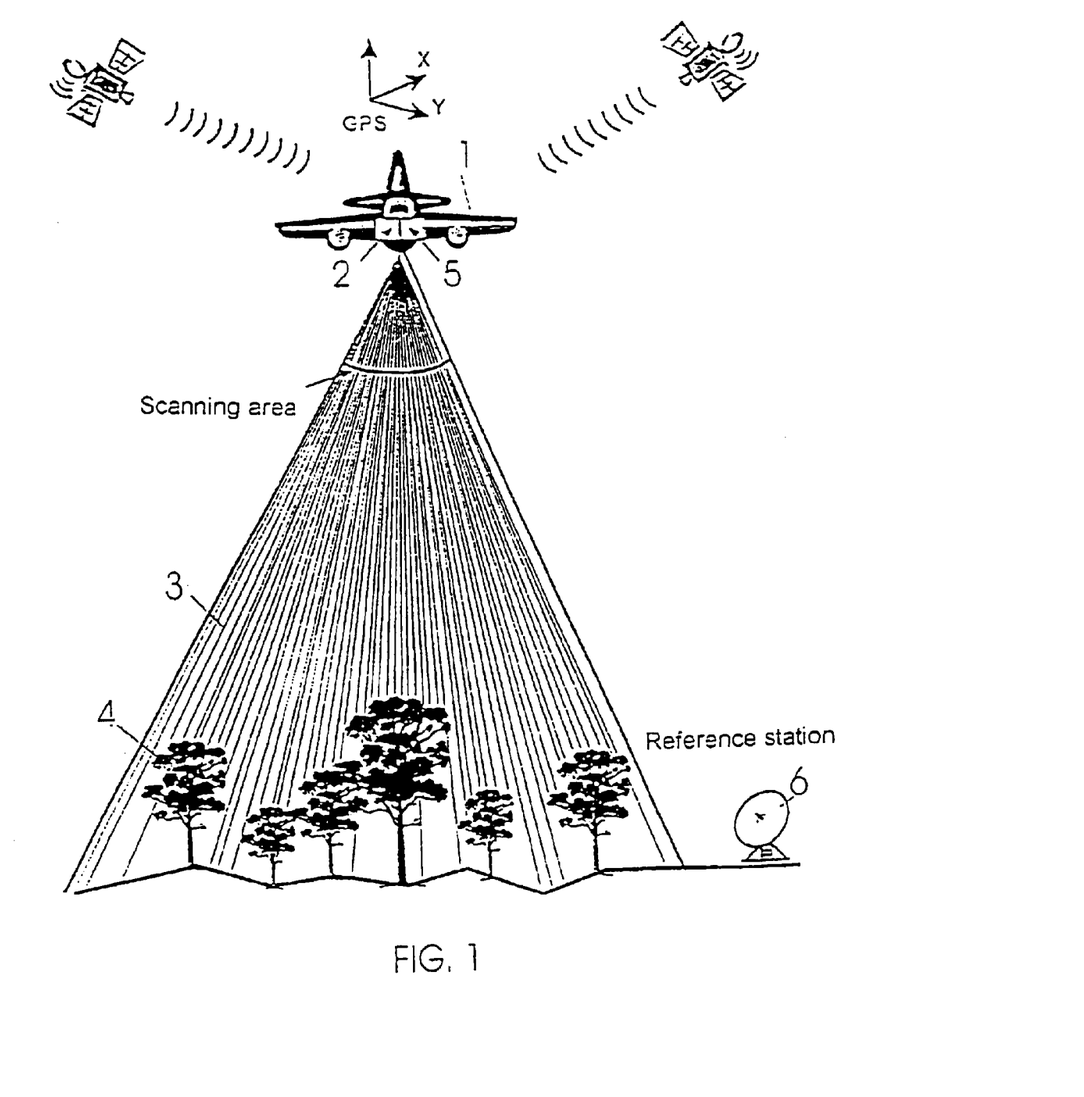
FIG. 1 is an overall view of the measurement situation of the invention.

FIG. 1 shows an overall view of the measurement situation of the method of the invention. The measurement is conducted from a flying platform 1 (an aeroplane, a helicopter, an unmanned platform, a model plane) above the stand. Of these platforms, the aeroplane is at the moment the best platform for measurements with small elevation variations, the helicopter is the best at mountainous areas and the most cost-effective platform is the unmanned aircraft or model plane. The laser scanner 2 consists of a scanning mechanism, which produces a deviation across the flight direction, of a laser gun, which produces laser pulses 3, and of a detection unit, which records the received signal and defines the distance to the target. The laser gun situated in the flying platform 1 of FIG. 1 transmits the laser pulse that hits the target and the pulse returns to the detection unit allowing the determination of the distance between the target and the laser on the basis of the time spent for the pulse. When the position and the orientation of the laser gun are precisely known, then the measured distance between the laser gun and the target 4 (in this case a tree) can be converted into height; this is the basics of the measurements of surface models using laser scanners. The orientation and position of the laser scanner 2 is typically defined with the inertia navigation system and with GPS-measurements (Global Positioning System, a global satellite network for positioning). The inertia system measures either orientation alone or both the orientation and position by using an inertia sensor. With laser scanning technology, it is typical to refer to the abbreviation INS, which is a perfect 6-dimensional measurement system (for both orientation and position). The GPS measurements in the laser scanning technique are typically conducted using one GPS receiver 5 in the same flying platform and another GPS receiver is on the ground as a reference station 6 in the neighborhood of the survey area, e.g. within 30 km range.

Since both the laser and the radar are active sensors (they transmit a signal that is received after having scattered from the target), the measurements can also be conducted at nighttime.

The imaging is performed using a scanner, which scans the pulses across the flight direction. In the other direction, the image is accomplished when the flying platform is moving along the flying direction. In this way, the target area is covered. The distances between-adjacent laser beams (the typical beam diameter is about couples of tens of cm) on the ground is influenced by the characteristics of the laser gun and the laser scanner (pulse repletion rate, the number of parallel pulses, field of view, and type of scanning), flying height and speed. Several scanning mechanisms are present. In conical scanning, the viewing angle remains constant all the time. In so called pushbroom scanning, the orientation of parallel beams is always constant.

Figure 2:
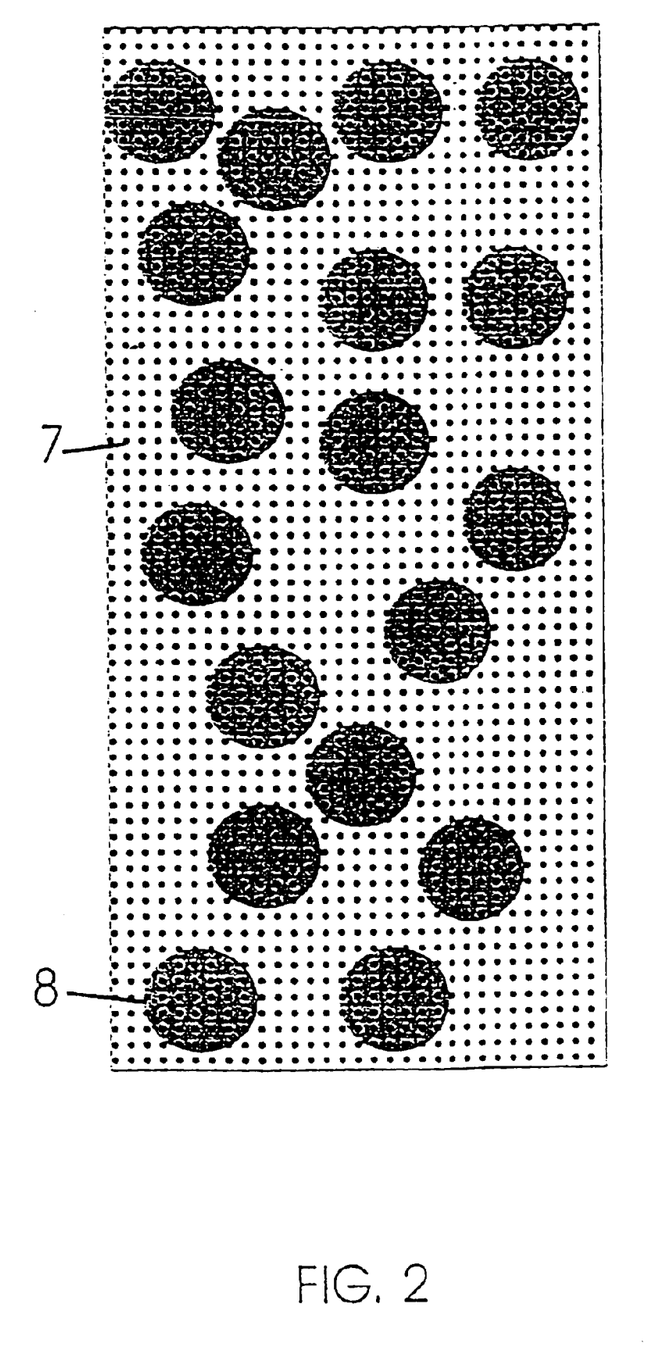
FIG. 2 illustrates the sampling rate achieved with a laser scanner from a forest area.

FIG. 2 shows a measurement scan pattern about how individual beams 3 are planned to cover the target area with target hits 7. The target hits 7 of FIG. 2 form a regular pattern along the flight track. Reference number 8 refers to the area covered by the stand crowns.

It is important in forest measurements to conduct the measurements as perpendicularly to the ground as possible in order to avoid shadowed areas. The viewing angle should be smaller than 10 degrees from the vertical. In some experiments, shadowing has been noticed to occur even with viewing angles higher than 5 degrees. In the invented method, one should use a laser scanner that is capable to transmit a sufficient number of laser pulses for the discrimination of individual trees or group of trees. The number of pulses needed depends of course on the accuracy of forest measurements required and the size of the crowns of the trees. In most cases, several pulses per square meter should be collected and the increase of the pulse rate up to even tens of pulses per square meter can bring significant improvement in accuracy, especially in the northern boreal forest zone. The optimization of the pulse/sample number is optimization between accuracy and costs. Depending on the above parameters, it is difficult to give any standard value for the pulse repetition rate, but 50 kHz can be regarded as a lower limit value, and with 200 kHz individual trees appear really well. At the moment, only a few instruments exist to meet the requirements. For example, a pulse repetition rate of TopoSys-1 is 80 kHz, the measurement density from the nominal height of 800 m is between 3 and 4 pulses per square meter and the accuracy in the x- and y-directions is better than 1 m. The z-direction accuracy is better than 15 cm on flat areas. A typical pulse repetition rate with other sensors is about 10 kHz, but the instruments are improving all the time.

The forest measurements are also affected by season. During wintertime with snow on the ground, laser measurements are not recommended to carry out, because the snow can scatter the pulse away from the detection unit. The optimal season is when there is a sufficient number of leaves and needles on the crowns to reflect the laser signal from the top, and the ground is not covered by heavy understory. Measurements in Finnish conditions have shown, however, that good-quality stand information can be produced also at the end of the summer or early autumn. With radar operating at radio frequency range, measurements can be conducted during all seasons. However, if the frequency is less than 5 GHz the height of trees without leaves becomes underestimated.

Since the measurements should be made with small viewing angles (with respect to the vertical), the area covered will be narrow (from the height of 800 m, the width is 282 m with a maximal viewing angle of 10 degrees). Therefore, depending on the application, several parallel flight lines will be needed to cover the whole area.

In the preferable embodiment of the invention, different pulse modes are utilized in order to produce various models. Typically each system is equipped with first and last pulse mode. With the first pulse mode you can detect targets which are closer to the laser and the last pulse mode can be used to find, e.g. the ground surface of a forest target. It was found that, in the invention, because both pulse modes include information from both the crowns and the ground, the best performance is obtained when combining the data of both modes. This also increases the number of pulses used. In the future, it may also be possible to record, in addition to these modes, or instead of these modes, the whole return profile, as was the case with previous non-scanning systems (J. Hyyppä, M. Hallikainen, 1993, "A helicopter-borne 8-channel ranging scatterometer for remote sensing, Part II: Forest Inventory", *IEEE Transactions on Geoscience and Remote Sensing,* 31:170–179). This, however, requires a very large data recording capacity.

By these means, the whole target area will be covered by small beams, and the coordinates for each of them can be defined. Due to the GPS system, the points are in WGS-84 system (for more information, the book *GPS-paikanmääritys (Markku Poutanen* 1998) is proposed) and they has to be converted to the desired coordinate system and projection (such as ykj and kkj in Finland) by using existing conversion formula. Mapping and surveying authorities in each country are capable to provide such conversion formulas. As a result, a digital file consisting of points a point cloud is formed. The file includes individual x, y, and z coordinates of hits defined in local coordinate and projection systems. Concerning coordinate and projection systems, the reader is referred to the book *Käytännon geodesia (Martti Tikka* 1985).

Calculation of Three-dimensional Tree Height Model

By analyzing the point cloud you can produce several kinds of surface models. In the following the various models are defined how they are used in the invention, since most of them lack a dear description.

The points reflected or scattered from the ground form a terrain model. The data produced with laser scanner before preprocessing is generally considered as digital surface model (DSM). By processing this raw data, digital terrain or elevation models (DTM, DEM) can be produced. By selecting the points, which are reflected from the top of the vegetation, we can create a digital vegetation model that can also be called a digital crown model in forested areas. In the invention, by measuring stands with a sufficiently high number of pulses, it is possible to calculate a height model, in which the terrain elevations have been removed and which can be used to derive true tree height where as in the crown model only the height to a certain reference (sea level) can be determined. The height model can be calculated by subtracting the digital terrain model from the digital crown model and the result is a three-dimensional representation of the tree heights within the forest area. The models can be presented by regular grids or as a cloud of points.

Figure 3:
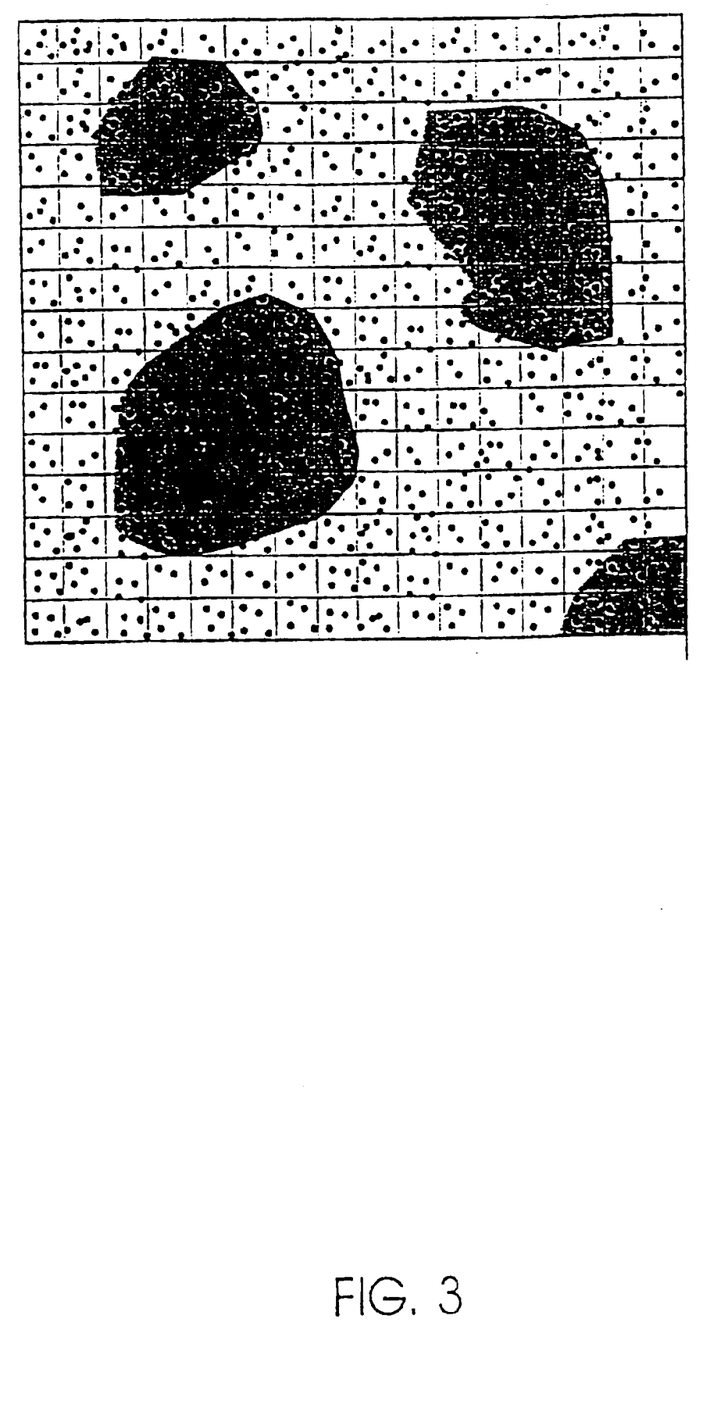
FIG. 3 shows the relation between the number of the samples and the resolution in a forest area.

This invention directly exploits the use of the digital tree height model in forest inventory. In the following there is presented an example of one realized solution. When calculating the crown model, terrain model or height model of a stand one should apply the following principles. The measured points are re-sampled into target grid (size of individual cells (henceforth called as pixel) and the whole target area is defined), see FIG. 3. When converting the points into the grid, one should remember that the conversion can cause position and elevation errors, especially when there is not a sufficient number of points for each pixel. In the invention, it has been discovered that, when separate trees or small tree groups are of inventory interest, the pixel size should be e.g. 1 m or preferably 0.5 m, when the determination of crown diameter is possible in a reliable manner. A simple mechanism to start the digital crown and terrain model calculation is to select the maximum and minimum z values within each pixel. We obtain two surfaces, one corresponding to maximum values (maximum surface) for the terrain model and another for minimum values (minimum surface). The maximum values represent rather well treetops, and on areas without trees, the surface of the terrain. The minimum values represent terrain elevations, but include also tree tops among other things. By using minimum filtering, one can calculate a so called rough terrain model from the minimum surface. The size of the filtering window has to be larger than the diameters of individual tree crowns. It was found in the invention that a good initial value for a minimum filter is 8 m in Finland in densely vegetated areas. After the minimum filtering, this so-called rough terrain model is compared with the coordinates of the original cloud of points. Points, that deviate from this minimum-filtered surface a pre-defined distance D, e.g. 1 m, are classified as ground hits. By using these hits, the missing surface heights are interpolated, e.g. using Delaunay triangulation. The new terrain model can be improved by iterations in the following way: by assuming this new surface as a new reference and comparing with the original cloud of point against this reference, we can calculate new ground hits for which the process is repeated. The iteration can be continued, until the number of re-classified points is low and the quality of the model is adequate. Another method to determine the digital terrain model is depicted in publication (K. Kraus, N. Pfeiffere, 1998 "Determination of terrain models in wooded areas with airborne laser scanner data", *ISPRS Journal of Photogrammetry & Remote Sensing,* 53:1993:203).

When there are holes (no data) or there are diverging points, the value for these points can be obtained by interpolation and using the knowledge of nearby pixels. For the identification of individual deviating pixels, e.g. a gradient can be calculated for each pixel. Deviating values can thus be removed.

Figure 4:
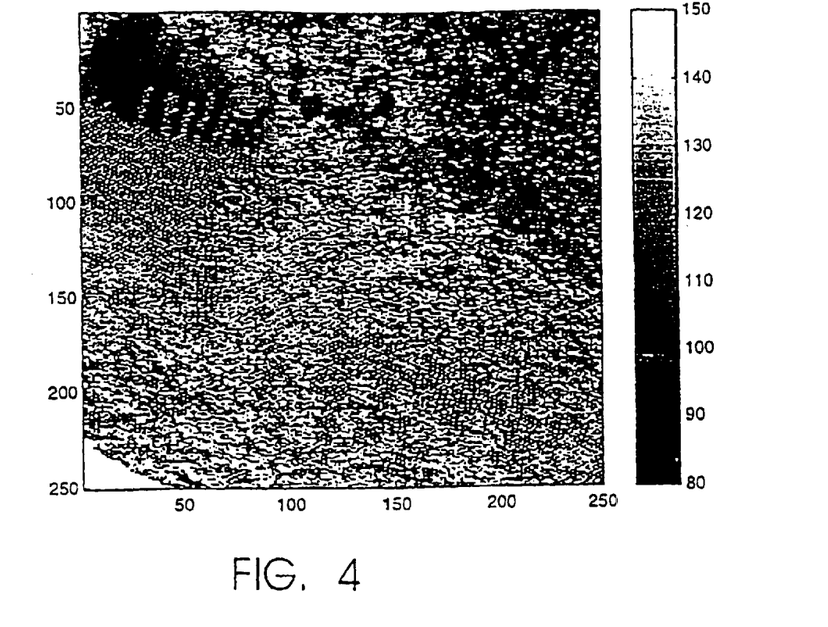
FIG. 4 is the minimum surface of a forest area calculated with true laser scanner data (the point with the lowest z-value is chosen from the points within each pixel). The pixel size is 50 cm, the whole area 125 m×125 m. Missing values (no hits) are coded to be 150.
Figure 5:
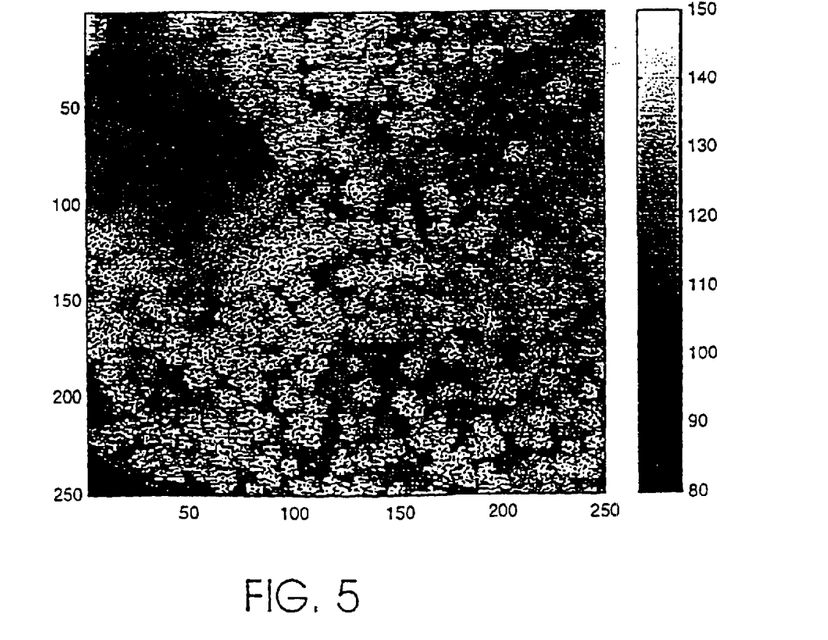
FIG. 5 is the maximum surface of a forest area calculated with true laser scanner data (the point with the highest z-value is chosen from the points within each pixel). Missing values (no hits) are coded to be 0.
Figure 6:
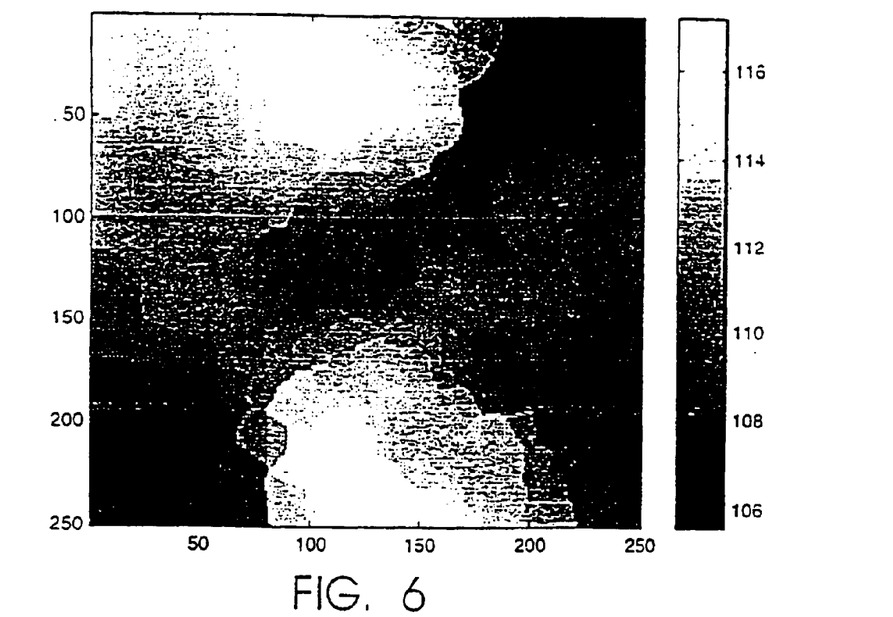
FIG. 6 is a calculated terrain model for data used in FIGS. 4 and 5. The terrain models show the terrain height at each point to the sea level.
Figure 7:
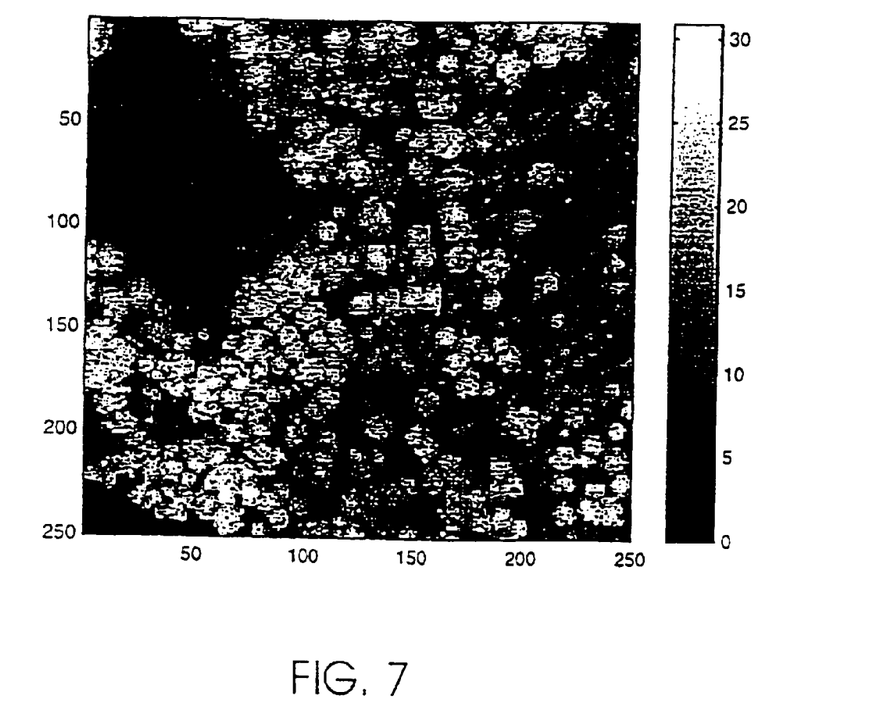
FIG. 7 is a calculated tree height model for data used in FIGS. 4 and 5. Individual trees and small groups of trees can really be discriminated from the tree height model. The resolution of the image is 50 cm.

FIG. 4 depicts a minimum surface obtained with laser scanner data. In each pixel the minimum z value is selected. The corresponding maximum surface is depicted in FIG. 5. The pixel size in both images is 50 cm and the image covers 125 m. FIG. 6 shows a digital terrain model calculated with the above-mentioned method using a D value of 1 m, with no iteration and with Delaunay triangulation. FIG. 7 shows the corresponding tree height model of the same area.

Determination of Stand Attributes from the Tree Height Model

For the first time in the world, in the invented method it has been noticed that the high-resolution tree height model can be used to determine the following individual tree attributes for trees seen from above: tree height, tree location, crown diameter, stem diameter e.g. at the height of 1.3 m, development class, age, stem volume, basal area and tree specie. For larger group of trees, one can determine, in addition to these parameters, the number of the stems and the crown closure percentage, both of which can be used for estimation of characteristics of sample plots and stands. In earlier studies, it was not possible to use features related to crown closure using laser in profiling measurements. Also from this point of view, the invention brings considerable new matter to the present knowledge. By using this information, one can determine stand attributes in a desired region.

In the following, an example is presented of one possible way to calculate these attributes.

In addition to the calculation and estimation, the method can make use of existing knowledge, which improves the quality of the estimates significantly. Also, considering this, the invention is unique.

The sample laser hits obtained within the area covered by the tree can be used to determine the geometry of the tree either in two-dimensional (cross-section) or three-dimensional manner and/or to determine the shape of the tree for tree specie identification or for modeling of the stand.

Figure 8:
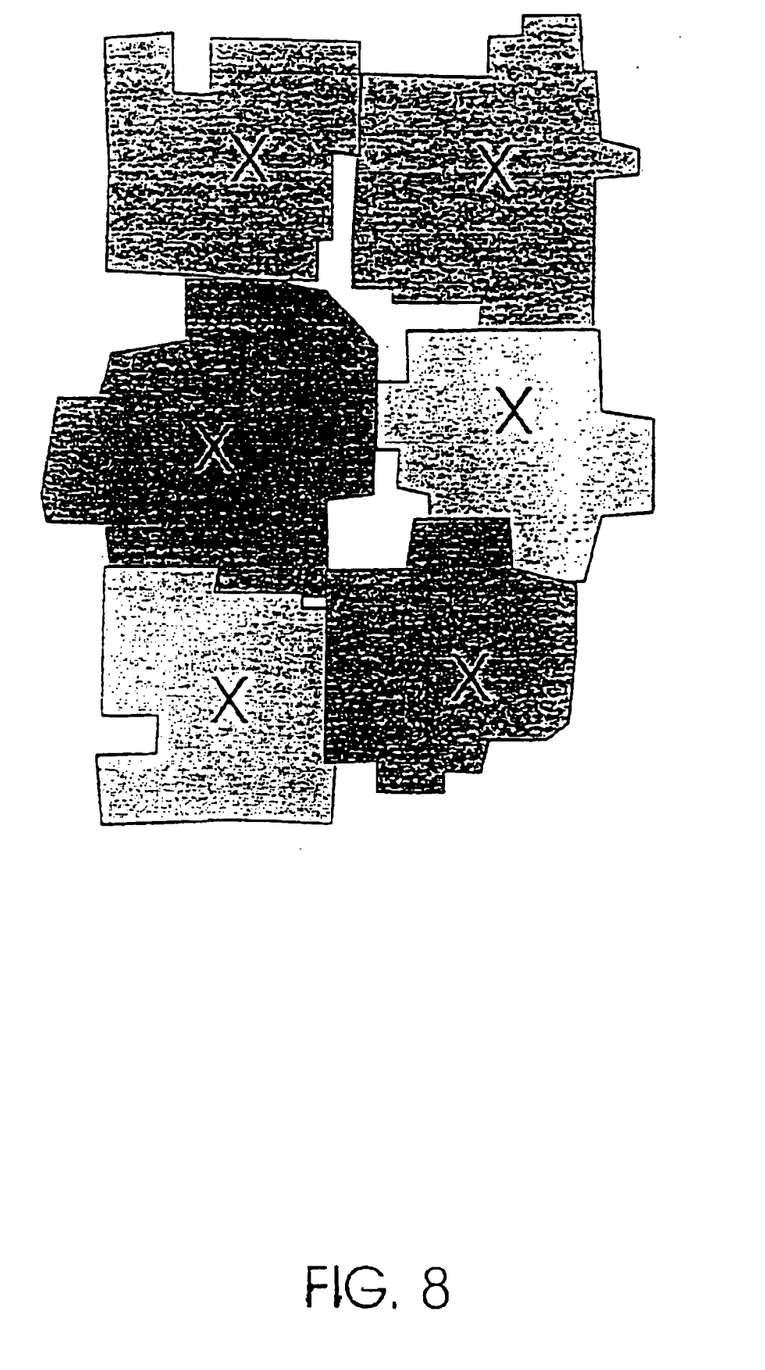
FIG. 8 is an example of segmented crowns. By segmentation one can delineate boundaries of crowns.

The calculation of stand attributes from the tree height model of the stand is performed in the following way. The location of individual trees and the tree crown boundaries are determined by using conventional pattern recognition methods. In general, the determination of tree locations is based on finding local maximums. In order to find the local maximums, a laser-derived tree height model is filtered by using a low-pass filter. The amount of filtering is affected by the pixel size used in tree height model of the stand and the number of laser pulses per square meter. Typically, one applied filtering is enough. Without any filtering, several local maximums can be found from the same crown. For the determination of crown boundaries or the size of the crown, there exist several applicable algorithms in the field of pattern recognition. In the process of delineating crown boundaries (or in the determination of the area corresponding to the tree crown, in segmentation), the parameters has to be selected in a way that two separate trees will not be merged to one, if possible. The choice of parameters can be done manually for the tree types in use. FIG. 8 is an example sketch of boundaries defined using automatic pattern recognition methods.

The average diameter of the crown L can be calculated by using the segmented crown area information A as follows.

$$L = \sqrt{\frac{4A}{\pi}} \quad (1)$$

Figure 9:
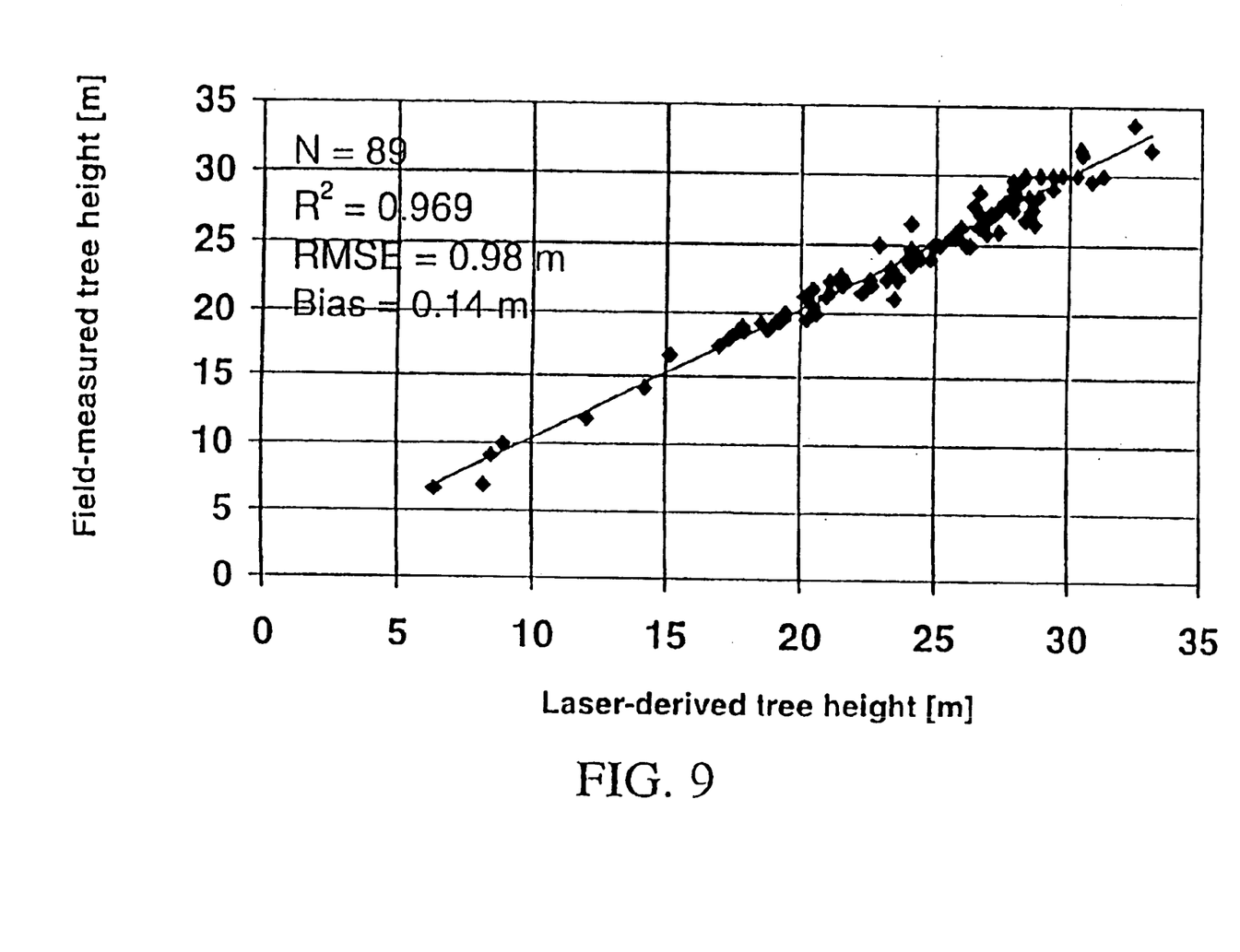
FIG. 9 is an example of the level of accuracy obtained for individual tree heights by using the invention.

The height of the tree h is supposed to be the maximum value of the tree height model (the highest point of the tree).

$$h = \max(h_i) \quad (2)$$

where $h_i$ are individual tree heights given by the tree height model within the corresponding crown/segment area A. It has been demonstrated in the invention by test measurements, that the height of individual trees and dominant trees can be measured with a standard error of 1 m, FIG. 9. As a reference material, hypsometer measurements were used for 89 trees. The bias of the measurement was 14 cm, which is an extremely good result. The coefficient of the determination was 0.97.

The location of the tree is determined by means of x and y coordinate data corresponding to the maximum point.

In the boreal forest zone, there exists a clear correlation between the average diameter L of the crown and the stem diameter d $$d = \alpha L + \beta \quad (3)$$

wherein coefficients α a and β preferably are calibrated using local field inventory data. The coefficients have to be determined for each tree species (e.g. pine, spruce, birch, and other deciduous trees) separately if the system utilizes tree species information.

Since the laser scanner provides also height information and since there exist a clear correlation between diameter and height, we can use the tree height information also for estimation. By using linear regression, the model for stem diameter is as follows $$d = \alpha L + \beta h + \gamma \quad (4)$$

where coefficients $\alpha$, $\beta$ and $\gamma$ are calibrated by using local field inventory data. The relation between height and diameter is not quite linear, since the form factor of the curve decreases when the stem diameter increases if the stem diameter is sufficiently wide. Additionally, the wider the stem, the larger the height scatter. When creating a more accurate height model, we first have to make linear the dependence between height and diameter and the variance of the height with respect to stem diameter has to be made constant. Näslund (1936) (M. Näslund, 1936, "Skogsförs öksanstaltens gallringsförsök i tallskog", Meddelanden från Statens skogsförsökanstalt 28 (1)) described the relation between the height and breast height diameter (breast diameter at the height of 1.3 m) as follows $$h = \frac{d^2}{(\alpha_1 + \alpha_2 d)^2} + 1.3 \quad (5)$$

By using a non-linear transformation, the model in Equation (4) can be improved. Also, the use of national curves is possible. Concerning Finland, corresponding curves can be found in publication (J. Laasasenaho, 1982, "Taper curve and volume functions for pine, spruce and birch", Communicationes Instituti Forestalls Fenniae 108, 74 p).

Possible errors related to crown diameters and thus on the determination of the individual tree diameter are that several crowns will be interpreted to belong to the same tree causing the segmented crown area and the corresponding diameter to be significantly larger than the real values. Therefore, the obtained crown diameter L should be checked e.g. with formula (3) from which a rough estimate for the stem diameter d is obtained. If statistical information is available on the probabilities of existing combinations of height and diameter pairs, most of the defectively defined crown areas can be found. E.g. if the existence probability is less than 1%, it is most likely that the effective size of the crown is falsely determined. Also, the existing knowledge on the mean size of crowns should be used. In Finland, the crown width is seldom larger than 8 m. Such rules, which are based on knowledge are not a necessity, but they improve the calculated estimates of the stand attributes. Because the laser scanner data is capable to provide both the tree height of individual trees and the stem diameter and the crown diameter, we can improve the accuracy of stem volume estimates significantly by using existing statistics and knowledge, which makes this invention to a unique remote sensing method in the world. Methods based on aerial photographs and video imagery are capable to determine solely the diameter of the crown. Without any other physical features to be able to measure, such checking is not feasible with these data sources. And because the individual tree volume is traditionally determined in a more accurate way by using both the height and the diameter than just using the diameter, it is possible to produce significantly more accurate volume estimates with laser scanner than by using aerial photos and video imagery. Preliminary results also suggest better accuracy than can be obtained with traditional forest inventory.

Knowledge can also be used to estimate the portion of trees below the dominant tree layer, since laser scanning can only provide height model of trees that can be seen from above. Therefore, the attributes can only be determined for such visible trees in the forest. If there exist knowledge on the most likely distribution of heights or diameters, the results of the laser scanning can be improved by using such distributions. Weibull distribution has became the most frequently used distribution to describe the diameter distribution. In Finland, the Weibull distribution was applied for the first time in the study by Kilkki and Päivinen (P. Klkki, R. Päivinen, 1986, "Weinbull-function in the estimation of the basal area DBH-distributions", Silva Fennica, 20: 149–156.). The Weibull distribution meets the typically requested flexibility requirements of diameter distributions (A. Kangas, J. Kangas, K. Korhonen, M. Maltamo, R. Päivinen, 1990, Metsää kuvaavat mallit, Silva Carerica 17, 143 p.). Beta distribution is even more flexible than the Weibull distribution, but the computation handling requires numerical integration in order to define a scaling factor. When the distributions are used, the distribution defined with laser scanner is compared with distribution that is known and concerning the missing trees, correction factors are calculated for each stand attribute. The use of distributions is not necessary, but it is recommended when the stand is known to be dense, the real distribution is known and when the target is to obtain the smallest possible systematic error. Without any correction, the laser scanner produces a systematic underestimation of the stem volume of the stand.

By using the diameter and height, the development class of the tree can be determined and the age of the tree can be estimated.

The basal area of an individual tree (m²/ha) is obtained from $$g = \frac{\pi}{4} d^2 \quad (6)$$

The number of stems can easily be determined as the number of crowns in the image.

The crown closure percentage can be determined by the area covered by tree crowns divided by the total area. Additionally, it can be determined by calculating the number of laser pulses reflected by the trees divided by the total number of laser pulses within the desired area.

For the determination of tree species there exist two feasible methods. In the publication (J. Hyyppä, Hyyppä, H., Samberg, A., 1999, Assessing Forest Stand Attributes by Laser Scanner, Laser Radar Technology and Applications IV, Proceedings of SPIE, 3707: 57–69) a cross-section image of the forest produced by laser scanning is described and conical spruces can easily be discriminated from pines and birches. The analysis can also be done in three dimensions, and then, based on the sample points within one area limited by the tree, the geometry and the shape of the tree are determined and this information is used for identification of the tree. Aerial photography is a relatively inexpensive media, and thus the combination of the laser scanner image with aerial photography gives better knowledge of the tree species. Then the aerial photograph can be orthorectified with the tree height model (e.g. filtered tree height model) produced by the laser, which also is a new innovation. By this mean, both the tree height model and aerial photograph can be put on top of each other. In aerial photograph (false color image) deciduous trees can easily be separated from spruces and pines and also a color difference can be observed between these two species. If the laser scanner produces intensity information of the scattered power, it can be used for tree species classification.

The estimation of the volume of individual trees can be done using parameters and attributes estimated earlier. You have three different alternatives: 1) estimation of the volume using just the height of the trees, 2) estimation of the volume using height and estimated stem diameter and 3) estimation of the volume using height, diameter and specie information. Laasasenaho (1982) (J. Laasasenaho, 1982, *"Taper curve and volume functions for pine, spruce and birch"*, Communicationes Instituti Forestalis Fenniae 108, 74 p.) has depicted formulas for how height and diameter can be used to calculate the volume of individual trees for each tree species as follows for pine $v=0.036089\ d^{2.01395}\ (0.99676)^d\ h^{2.07025}\ (h-1.3)^{-1.07209}$ (7)

for spruce $v=0.022927\ d^{1.91505}\ (0.99146)^d\ h^{2.82541}\ (h-1.3)^{-1.5354}$ (8)

for birch $v=0.011197\ d^{2.10253}\ (0.98600)^d\ h^{3.98519}\ (h-1.3)^{-2.65900}$ (9)

The standard errors of the models are roughly between 7 and 8.5%.

The stand attributes corresponding to a sample plot or a stand can be determined by using the attributes of individual trees in the specified area. For example, the total volume per hectre corresponding to a stand can be calculated by summing up all volumes of individual trees within that stand and by dividing the total volume with the size of the stand. With the pre-described distribution principle, the accuracy of the estimates can be improved concerning the trees not visible with the laser. In that case one should the remember that there has to be prior knowledge of the distribution of the stand. The mean height of the stand can be obtained either as an arithmetic average of individual tree heights. Usually a weighed average is calculated in forest inventory, wherein the weighting parameter is the basal area of each tree. The total basal area per hectare can be obtained by summing up all the basal areas of individual trees and dividing the result by the stand size.

A simplified version of the method is to produce volume information by assessing the crown closure percentage, the basal area or a corresponding density measure by using crown areas and by assessing volume of the trees by this information added with mean tree height (that is determined using tree height model) from relascope table presented by livessalo (Tapion Taskukirja 1978).

Most forests have already been inventoried several times. The results of the presented method can be improved using old/historical inventory information requiring that the old field inventory data is reliable. Old inventory data should be used so that impossible results are avoided. For example, a stand which 10 years ago had a volume of 5 m³/ha can not have a volume of 200 m³/ha at this moment.

Performed tests have shown that the developed method has an accuracy comparable or even better than conventional operative forest inventory methods.

The method is feasible for forest inventory of individual trees, groups of trees, sample plots, stands and larger areas. In the following, the applicability of the method on standwise forest inventory and national forest inventory is depicted. These two inventory types are economically most important in Finland.

The method is applicable to standwise forest inventory, especially if it is combined with already collected standwise inventory information. The laser-derived stand attributes can then be combined with other information needed, such as land/fertility data, which do not changed very rapidly. The laser-derived terrain model can also be used for mapping key biotopes.

The method is extremely feasible for national forest inventory. Laser scanning is typically used to produce a strip of couple of hundreds meters in width. In order to cover large areas, several parallel strips need to be flown. The turns between the planned flight lines should not miss the connection to GPS satellites and takes a lot of time causing the increase in expenditure. In national forest inventory, the data provided by the laser scanner makes it possible to reduce field work, and the results obtained for individual trees and samples plots with laser scanner can be used to teach satellite data sources. Also flying is efficient in forest inventory of the country. The flight lines can be planned to cover the whole country. By using the invented method, the national forest inventory can be automised to a high extent. In the Finnish Forest Research Institute they have tried to develop—with the help of imaging spectrometer (AISA)—the collection of stand attributes and the reduction of field sample plots. The results obtained with AISA are, however, significantly poorer than the results obtainable with the invented method.

What is claimed is:

1. Method for determination of stand attributes with an instrument above the stand, comprising:

moving a laser scanner in a first direction, collecting three-dimensional information from a stand by sweeping a laser beam of the laser scanner in a second direction substantially perpendicular to the first direction and by using such a number of sample hits that individual trees or groups of are identified, producing a three-dimensional presentation of a stand height from the collected three-dimensional information, and determining stand attributes, being characteristics of individual trees or groups of trees and characteristics for larger stand areas, from the three-dimensional presentation.

2. Method as claimed in claim 1 wherein the number of sample hits, is selected according to a precision requirement.

3. Method as claimed in claim 1 wherein the information collected is information based on three-dimensional distance measurements.

4. Method as claimed in claim 1 wherein the three-dimensional presentation of the stand height is obtained by calculating a difference between a crown model representing a highest points of a vegetation and a terrain model representing terrain heights.

5. Method as claimed in claim 1 wherein a three-dimensional tree height model is produced by using recording modes and by combining results of these recording modes to increase an amount of available sample hit.

6. Method as claimed in claim 1 wherein the sample hits that are obtained from a given tree are used either in a two-dimensional or three-dimensional way to determine a geometry and a shape of the tree.

7. Method as claimed in claim 1 wherein characteristics of individual trees or groups of trees obtained from a tree height model are location, age, height, diameter of the crown, stem diameter, basal area, development class, tree specie, stem volume and number of stems per area unit.

8. Method as claimed in claim 7 wherein the location and crown boundaries of individual trees are analyzed with pattern recognition methods.

9. Method as claimed in claim 7 wherein the height is determined by taking a maximum stand height value of the tree height model within a corresponding crown area.

10. Method as claimed in claim 7 wherein the stem diameter is derived by using an average crown, diameter or an average diameter of the tree height and crown diameter.

11. Method as claimed in claim 7 wherein the development class and the age of the tree are determined by using diameter and height for each tree species separately.

12. Method as claimed in claim 7 wherein the number of stems is determined by using a number of crowns defined from an image.

13. methods as claimed in claim 1 wherein a crown closure percentage is determined by an area covered by tree crowns divided by a total area.

14. Method as claimed in claim 13 wherein the crown closure percentage is determined by calculating laser pulses reflected by the trees divided by a total number of laser pulses within a certain area.

15. Method as claimed in claim 8 wherein for a larger group of trees, in addition to the characteristics of individual trees and groups of trees and their statistical information, a number of stems and crown closure percentage are determined, both of which are used for estimation of characteristics and attributes of sample plots and stands.

16. Method as claimed in claim 8 wherein the stand volume is determined by using a mean stand height and crown closure percentage, the crown closure percentage is an area covered by crowns divided by a total area or basal area.

17. Method as claimed in claim 1 wherein information from aerial photographs and satellite imagery are added to the information used for the determination of the stand attributes, in addition to the information obtained with laser scanning.

18. Method as claimed in claim 1 wherein the characteristics related to a quality of the wood are determined by defining a length of knotless stem from the three-dimensional information.

19. Method as claimed in claim 1 wherein the determination of the stand attributes from information collected by the laser scanner is carried out by using a computer program.

20. computer program for the determination of stand attributes from information, which have been obtained using an instrument located above the stand, comprising:

a) three-dimensional information is collected from the stands by using a beam of a laser scanner that is scanned back and forth in a direction that is perpendicular to a forward movement of the instrument and by using such a number of sample hits that individual trees or groups of trees are distinguished b) a three-dimensional presentation of the stand height is produced from the collected information, and c) stand attributes which are characteristics of individual trees or groups or trees and characteristics for larger areas derived using these information are determined from a tree height model.

* * * * *